United States Patent
Shaffer et al.

(10) Patent No.: US 7,602,894 B1
(45) Date of Patent: Oct. 13, 2009

(54) METHOD AND SYSTEM FOR CALLER ASSOCIATION

(75) Inventors: Shmuel Shaffer, Palo Alto, CA (US); Labhesh Patel, Mountain View, CA (US); Johnny Hsienchow Lee, Mountain View, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 983 days.

(21) Appl. No.: 10/443,630

(22) Filed: May 21, 2003

(51) Int. Cl.
*H04M 3/42* (2006.01)
(52) U.S. Cl. .............. 379/210.02; 379/207.13
(58) Field of Classification Search ........... 379/210.02, 379/210.01, 211.01, 211.02, 142.09, 201.01, 379/201.11, 210.03, 212.01, 207.13
See application file for complete search history.

(56) References Cited

U.S. PATENT DOCUMENTS

| | | | |
|---|---|---|---|
| 5,901,209 A * | 5/1999 | Tannenbaum et al. | 379/142.09 |
| 6,219,407 B1 | 4/2001 | Kanevsky et al. | 379/88.02 |
| 6,327,353 B1 * | 12/2001 | Fukuzawa et al. | 379/201.01 |
| 6,343,120 B1 * | 1/2002 | Rhodes | 379/142.01 |
| 6,374,102 B1 | 4/2002 | Brachman et al. | 455/422 |
| 6,393,117 B1 * | 5/2002 | Trell | 379/207.1 |
| 6,459,782 B1 | 10/2002 | Bedrosian et al. | 379/201.08 |
| 6,483,898 B2 | 11/2002 | Lew et al. | 379/88.12 |
| 6,728,355 B2 * | 4/2004 | Kowalski | 379/142.06 |
| 7,027,575 B1 * | 4/2006 | Burgess | 379/201.01 |
| 7,110,515 B2 * | 9/2006 | Akhteruzzaman et al. | 379/201.01 |
| 7,120,236 B1 * | 10/2006 | Schneider | 379/201.01 |
| 2003/0147519 A1 * | 8/2003 | Jain et al. | 379/211.02 |
| 2004/0101123 A1 * | 5/2004 | Garcia | 379/220.01 |

* cited by examiner

*Primary Examiner*—William J Deane
(74) *Attorney, Agent, or Firm*—Baker Botts L.L.P.

(57) ABSTRACT

A method for caller association includes receiving from a user a first request for a number that may be called to reach the user and generating a first number that may be called to reach the user. The method includes communicating the first number to the user and receiving from the user a first identifier associated with the first number. The first identifier comprises an identifier of a first party. The method includes receiving a first call for the user at the first number and communicating the first call and the first identifier to the user. The method may include storing the first identifier associated with the first number in a memory and retrieving the first identifier associated with the first number from the memory upon receipt of the first call for the user at the first number.

34 Claims, 2 Drawing Sheets

METHOD AND SYSTEM FOR CALLER ASSOCIATION

TECHNICAL FIELD OF THE INVENTION

This invention relates generally to communication systems and, more particularly, to a method and system for caller association.

BACKGROUND OF THE INVENTION

With current implementations of caller identification, the called party receives the phone number of the phone used by the calling party. This system works when the caller uses a predetermined phone (e.g., their home phone or their cell phone) to place the call. When the call is placed from an unrecognized phone (e.g., public phone, lobby phone, etc.), the phone number from which the call has been placed provides little if any information about the caller.

There are particular situations wherein a person would like to make their private phone number available to the other party for only a limited time, or reserve the ability to block future phone calls from a specific person altogether. For example, a doctor may want to give their phone number to a patient after a surgery and make it available for them until they are no longer in a critical condition. It may be desired to disable this direct access after the patient recovers and enforce the access through normal channels (appointment desk, nurse, etc.). People who are dating may desire to be able to give out their phone number and preserve the ability to block calls from a specific caller regardless of the phone the caller is using to make the call.

SUMMARY OF THE INVENTION

The present invention provides a method and system for caller association that substantially eliminates or reduces at least some of the disadvantages and problems associated with previous methods and systems.

In accordance with a particular embodiment of the present invention, a method for caller association includes receiving from a user a first request for a number that may be called to reach the user and generating a first number that may be called to reach the user. The method includes communicating the first number to the user and receiving from the user a first identifier associated with the first number and/or an identification of the called phone (e.g., endpoint). The first identifier comprises an identifier of a first party. The method includes receiving a first call for the user at the first number and communicating the first call and the first identifier to the user.

The method may also include storing the first identifier associated with the first number in a memory and retrieving the first identifier associated with the first number from the memory upon receipt of the first call for the user at the first number. The method may additionally include charging a fee to the user for the first request for a number that may be called to reach the user. The method includes the ability to deactivate the first number so that the first number may no longer be called to reach the user. The first number may be recycled after a certain period of time so that the first number may be called to reach another user.

In accordance with another embodiment, a system for caller association includes a number rendered operable to receive from a user at an interface a first request for a number that may be called to reach the user. The system includes a number generator coupled to the number renderer. The number generator is operable to generate a first number that may be called to reach the user. The number renderer is further operable to communicate the first number to the user. The system includes a number associator coupled to the number renderer. The number associator is operable to receive from the user a first identifier associated with the first number. The first identifier comprises an identifier of a first calling party. The number associator is further operable to store the first identifier associated with the first number in a memory coupled to the number associator. The system includes a number mapper coupled to the memory. The number mapper is operable to retrieve the first identifier associated with the first number from the memory upon receipt of a first call for the user at the first number. The interface is operable to communicate to the user the first call and the first identifier.

In accordance with the teachings of the present invention, the first number will be associated with the user, such that calls to the first number will reach an endpoint of the user. The user may obtain any number of additional numbers (e.g., second and third numbers) such that any attempt to contact the first, second and/or third numbers will reach the same endpoint, but the user will be able to determine who initiated the call.

The number renderer may also be operable to deactivate the first number so that the first number may no longer be called to reach the user. The system may also include a number recycler coupled to the number renderer. The number recycler may be operable to recycle the first number after a certain period of time so that the first number may be called to reach another user.

Technical advantages of particular embodiments of the present invention include a method and system providing caller association based on the caller instead of the phone or device from which the call is being made. Thus, callers may be identified regardless of the device used to make the call. Other advantages of caller association systems described herein include the ability of users to hand out numbers without fear of receiving unsolicited calls. Users can also deactivate a number as desired, for example, if the number falls into the hands of an undesired caller. Moreover, caller association systems described herein dynamically generate as many numbers as needed for particular users without requiring manual configuration and multiple line assignment. Accordingly, substantial costs and time are saved.

The teachings of the present invention allow the user to configure the system such that the user will receive calls from third parties of their choice, but calls from some or all other third parties may be blocked. Furthermore, the user may designate a specific period for call blocking to be effective. In this manner, the user may designate a specific period of time (e.g., 1 hour, 1 day or 1 month) during which the user will accept calls from personal acquaintances, but calls from business associates and/or supervisors will be blocked, or vice-versa.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
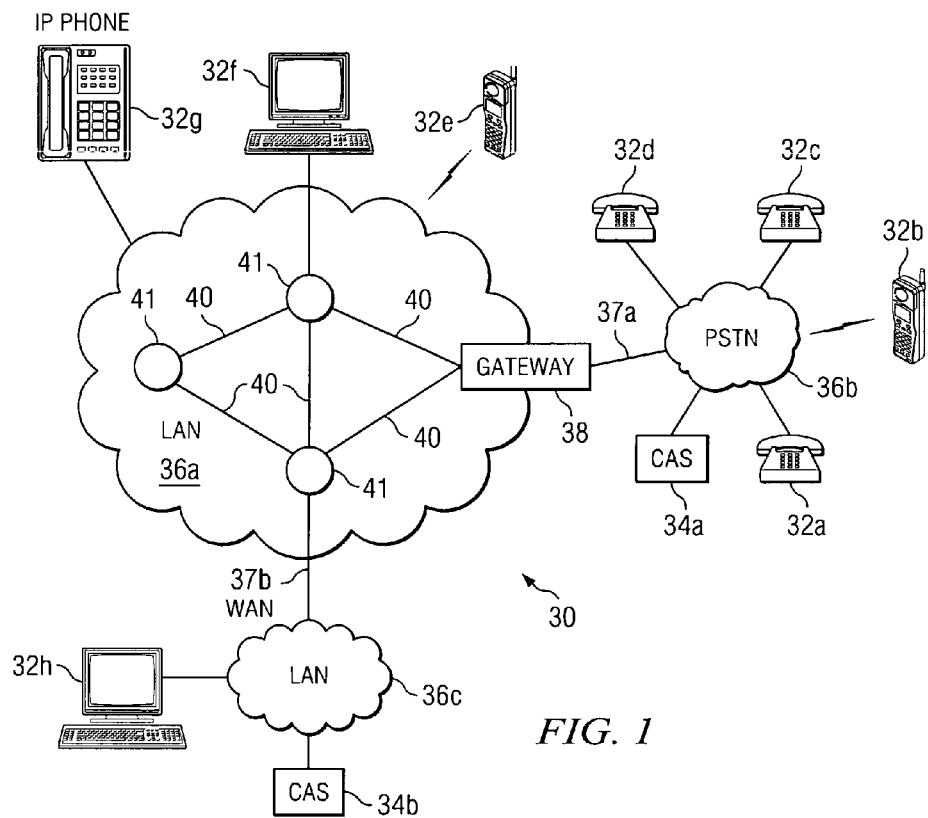
FIG. 1 illustrates a communication system including a plurality of endpoints operable to communicate among each other and a plurality of caller association systems, in accordance with a particular embodiment of the present invention.

FIG. 1 illustrates a communication system 30 including a plurality of endpoints 32a-32h having the ability to establish communication sessions between each other and/or caller association systems 34a-34b, using one or more of communication networks 36a-36c. Caller association systems (CASs) 34a-34b enable a user to associate particular numbers with particular callers such that upon being called by a certain caller, the user knows the identity of the calling party no matter from where the call originates. The caller association system(s) also associates the particular number(s) with an endpoint(s) associated with the user. For purposes of this specification, a "call" shall include a request for communication transmitted using any audio and/or video means, including signals, data or messages transmitted through voice devices, text chat, web sessions, instant messaging, facsimile and e-mail. For purposes of this specification, a "number" shall include any alphanumeric string which may be used to call a party. For example, in particular embodiments a number may be a ten digit string of characters that includes a three digit area code. In another embodiment, the number may be another type of user identification, for example an email address.

The user may give out a certain number to a particular individual or group of individuals. Such individuals may use the number to call the user. When the number is used by an individual to call the user, a caller association system 34 maps the number to the individual and the user and enables the individual to be connected to the user. Thus, the caller is identified based on the number used to call the user. The user may make a given number active only for a certain period of time such that after the time period expires the number cannot be used to call the user.

In the illustrated embodiment, communication network 36a is a local area network (LAN) that enables communication between a plurality of endpoints 32a-32h which may be distributed locally or across multiple cities and geographic regions. Communication network 36b is a public switched telephone network (PSTN) and couples endpoints 32a-32d and CAS 34a with communication network 36a through gateway 38. Communication network 36c is another LAN, which couples endpoint 32h and CAS 34b with communication network 36a. Accordingly, users of endpoints 32a-32h and CASs 34a-34b can establish communication sessions between and among each network component coupled for communication with one or more of networks 36a-36h. Communication links 37a and 37b couple communication networks 36a and 36b, and communication networks 36a and 36c, respectively. In the illustrated embodiment, communication link 37b is a wide area network (WAN), which couples LANs 36a and 36c.

Communication network 36a includes a plurality of segments 40 and nodes 41 that couple endpoints 32e-32g with gateway 38 and communication networks 36b-36c. Therefore, users of endpoints 32e-32g are provided with access to endpoints 32a-32d, 32h and CASs 34a-34b. Nodes 41 may include any combination of network components, gatekeepers, call managers, routers, hubs, switches, gateways, endpoints or other hardware, software or embedded logic implementing any number of communication protocols that allow for the exchange of information in communication system 30.

Although the illustrated embodiment includes three communication networks 36a-36c, the term "communication network" should be interpreted as generally defining any network capable of transmitting audio and/or video telecommunication signals, data and/or messages, including signals, data or messages transmitted through text chat and e-mail. Any one of networks 36a-36c may be implemented as a local area network (LAN), wide area network (WAN), global distributed network such as the Internet, Intranet, Extranet or any other form of wireless or wireline communication network. Generally, network 36a provides for the communication of packets, cells, frames or other portions of information (generally referred to as packets herein) between endpoints 32a-32h. Communication network 36a may include any number and combination of segments 40, nodes 41, endpoints 32a-32h and/or CASs 34a-34b.

In a particular embodiment, communication network 36a employs voice communication protocols that allow for the addressing or identification of endpoints, nodes and/or CASs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast or other techniques for exchanging media packets among components in communication system 30. Any network components capable of exchanging audio, video or other data using frames or packets, are included within the scope of the present invention.

Communication network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoints 32e-32g and gateway 38 are IP telephony devices. IP telephony devices have the ability of encapsulating a user's voice (or other input) into IP packets so that the voice can be transmitted over communication network 36a. IP telephony devices may include telephones, fax machines, computers running telephony software, nodes, gateways or any other device capable of performing telephony functions over an IP network.

It will be recognized by those of ordinary skill in the art that endpoints 32a-32h, CASs 34a-34b, and/or gateway 38 may be any combination of hardware, software, and/or encoded logic that provides communication services to a user. For example, endpoints 32a-32h may include a telephone, a computer running telephony software, a video monitor, PDA, a camera or any other communication hardware, software and/or encoded logic that supports the communication of packets of media (or frames) using communication network 36a. Endpoints 32a-32h may also include unattended or automated systems, gateways, other intermediate components or other devices that can establish media sessions. Although FIG. 1 illustrates a particular number and configuration of endpoints, CASs, segments, nodes and gateways, communication system 30 contemplates any number or arrangement of such components for communicating media.

Figure 2:
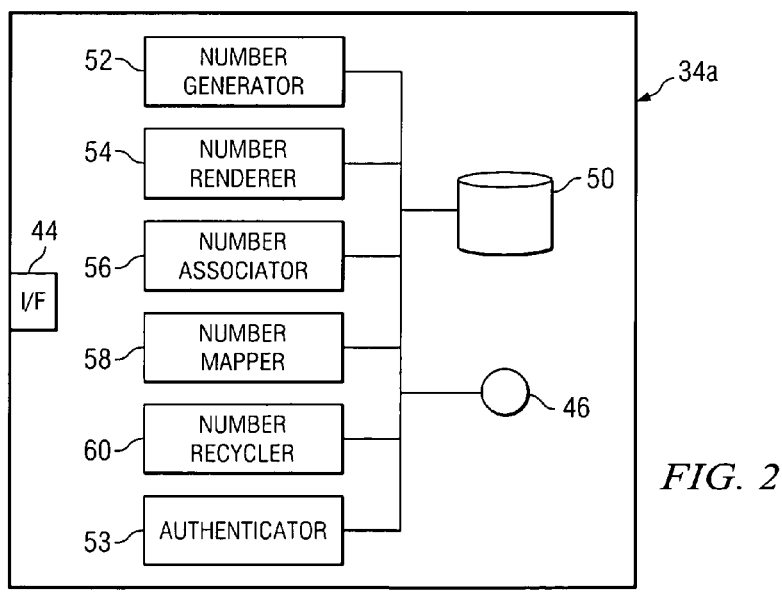
FIG. 2 illustrates a caller association system of FIG. 1 in more detail, illustrating aspects of the present invention.

FIG. 2 illustrates caller association system 34a in more detail, in accordance with a particular embodiment of the present invention. Caller association system 34a includes an interface 44, a memory module 50, a generator 52, a renderer 54, an associator 56, a mapper 58 and a recycler 60. Interface 44 couples caller association system 34a with communication network 36b. Processor 46 may be a microprocessor, controller or any other suitable computing device or resource. Memory module 50 may be any form of volatile or non-volatile memory including, without limitation, magnetic media, optical media, random access memory (RAM), read-only memory (ROM), removable media or any other suitable local or remote memory component. It will be understood by those of ordinary skill in the art that caller association system 34a may include any number of processors or memory modules to accomplish the functionality and features described herein. The processors and memory modules associated with caller association system 34a may be centrally located (local) with respect to one another or distributed throughout a communication network.

Number generator 52 associates with memory module 50 to keep track of all of the numbers used by caller association system 34a. Upon request, number generator 52 produces a new number that either has never been used or has not been used for a certain period of time.

Number renderer 54 is a component through which a user makes a request for one or more numbers to be given to potential callers at which the callers may reach the user in a call. In particular embodiments number renderer 54 may be web based and may utilize any web server. In some embodiments, renderer 54 replies to the request from a browser of an IP phone. In another embodiment, renderer 54 replies to the request from a telephone user interface (TUI). The user may request single or multiple phone numbers from number generator 52 via number renderer 54. Such request may be made by the user on the user's telephone, personal computer, IP phone, cell phone, personal digital assistant (PDA) or other device. In some embodiments, a request may be made by e-mail or instant messaging. Number rendering may also be performed by an operator at the user's request, such as in the event that a user is out of the office and without web access. Such a user may dial a helpdesk associated with the caller association system and request one or more numbers as alternate numbers through which a calling party may reach the user.

Number associator 56 allows a user to assign an alphanumeric string to a given number. Upon receiving a new number from number generator 52, the user may access number associator 56 and key in an alphanumeric string, such as the name of a person, to be associated with this specific new number. For example, if a doctor receives from number generator 52 a new phone number at which the doctor may be reached and hands out this phone number to a patient named Mrs. Smith, the doctor may enter Mrs. Smith's name to be associated with the number given to her. In particular embodiments, the doctor may give out a unique number to each of the doctor's patients. In the event that TUI is used as an interface to the system, the system may utilize access service request (ASR) for enabling entry of the alphanumeric string by a user for identification of an individual or group to whom a number has been given.

Caller association system 53 also includes an authenticator module 53. In particular embodiments, authenticator module 53 requires the user to authenticate him/herself, for example, by verifying a user name, account number and/or password associated with the user.

Number mapper 58 accesses memory module 50 to identify both the called party and the calling party upon the dialing of a number given out by a user of caller association system 34a. Such identification is made regardless of the number from which the call is made. For example, assume in the doctor/patient example described above that the doctor gave his patient Mrs. Smith the number 214-215-4996 (which he had previously received from number renderer 54) and entered Mrs. Smith's name as being associated with this number. In such case, when Mrs. Smith calls the number 214-215-4996, number mapper 58 would identify this number as previously being given to the doctor by the system and associated by the doctor with Mrs. Smith.

In particular embodiments, upon making such identifications, number mapper 58 may replace the caller ID information from a PSTN with the name and or other alphanumeric identifier associated by the user with the calling party. In some embodiments number mapper 58 may merely augment the caller name or other alphanumeric identifier to the number, obtained from the PSTN, from which the call is placed. The call is directed to the user. In the event that the user has a different, primary or permanent number (which may be unlisted or not publicly available), the calling party reaches the user without having access to such primary or permanent number.

Number recycler 60 receives a request from a user to recycle a particular number when the user no longer wishes to receive calls from the person to whom the user has given the particular number. Number recycler 60 then returns such number to number generator 52 where the number is added to a recycled numbers list. If this number is called within a certain period of time (i.e., a number of months), caller association system 34a may play a prompt to the caller advising the caller that the number is no longer available. Such period of time may be referred to as the "dormant time period." The prompt may also direct the caller to call a different number, such as a number of a general appointment desk in the doctor/patient example. In particular embodiments, if the number is not called for a period longer than the dormant time period, the number can be brought back into circulation and can be made available to another user when a new number request is made.

Components of caller association system 34a described and illustrated may comprise any suitable hardware or software necessary to achieve the functions described herein. Such components may be combined and/or divided into other components as may be required for particular needs. Caller association systems in accordance with particular embodiments may also include additional components or features as may be suitable.

Users of caller association systems described herein may request, give to and associate numbers with particular groups of potential callers. For example, a user may give a particular number to all the user's business contacts and associate such number with an identifier of "business" so that any calls to the user through that number will be mapped by the system as coming from a "business" contact. The user may give another number to all the user's personal contacts and associate such number with an identifier of "personal" so that any calls to the user through that number will be mapped by the system as coming from a "personal" contact. In other embodiments, a user may request from a caller association system a different number for each potential caller of the user.

As discussed above, a user may also make numbers that are requested from the system and given to potential callers available for only a limited period of time. For example, a person in a social setting handing out numbers at which they may be reached (such numbers requested from a caller association system) may only allow potential callers to whom the numbers are given to reach the user for a certain period of time. Such period of time may be predetermined by the user or may be effected by directing the caller association system to deactivate the number at a particular time so that the user may no longer be reached through the number.

In particular embodiments, business organizations or enterprises may utilize the teachings discussed herein by associating multiple "extensions numbers" with a single person. For example, a caller may call the main number of a particular organization and may enter an extension in order to reach a certain employee of the organization. Such extension may be one of a plurality of extensions which may be used to reach the employee on a call, and may thus be given out only to the specific caller (or to a specific group). Thus, the extension may have previously been associated with the specific caller by the employee or the organization at a caller association system utilized by the organization. Therefore, the organization is able to identify the calling and the called party without regard to where the call is originating from.

An owner, operator or manager of a caller association system may charge a fee to user's for use of the system. Such fee may be based upon the amount of numbers requested by the user at which the user may be reached by callers. For example, a doctor may request twenty numbers to hand out to recent surgery patients, one number for each patient. The doctor may pay a fee for each number generated and rendered by the caller association system.

Figure 3:
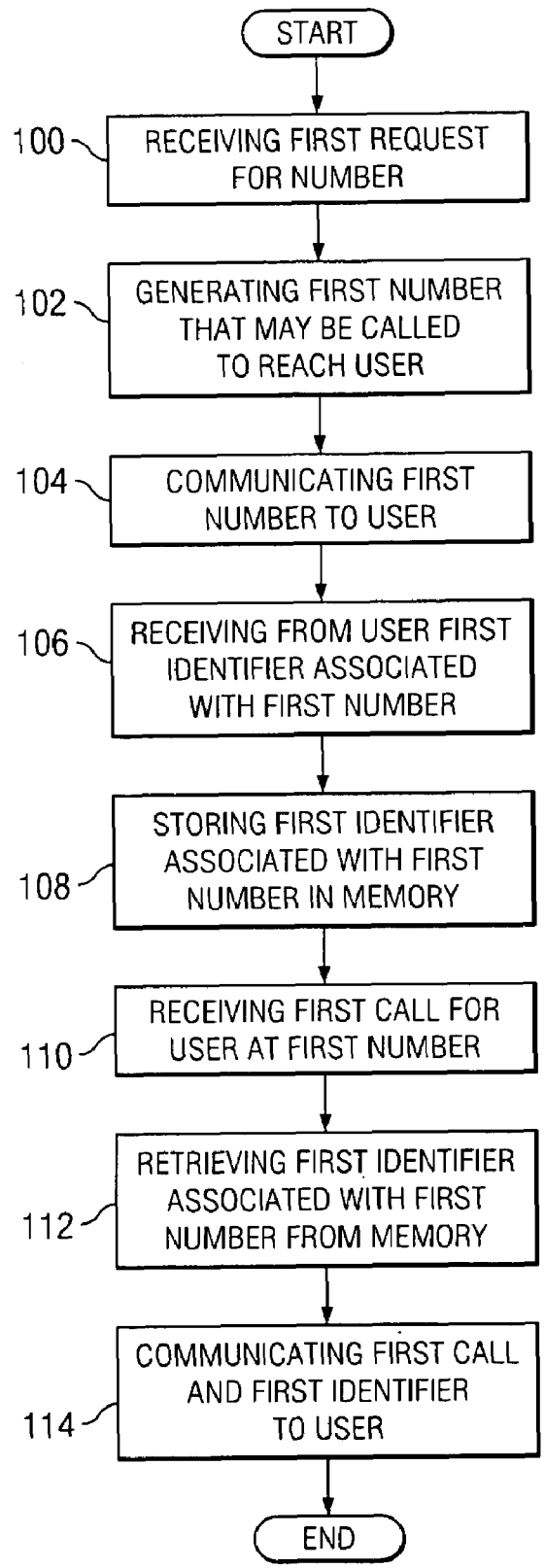
FIG. 3 illustrates a method for caller association, in accordance with an embodiment of the present invention.

FIG. 3 is a flowchart illustrating a method for caller association, in accordance with a particular embodiment of the present invention. The method begins at step 100 where a first request for a number is received from a user. The request is for a number that may be called to reach the user. At step 102, a first number that may be called to reach the user is generated. At step 104, the first number is communicated to the user. The user may then give the first number to any number of individuals who might desire to call the user.

At step 106, a first identifier associated with the first number is received from the user. The first identifier comprises an identifier of a first party. Such party may be one or more individuals to whom the user gave the first number. At step 108, the first identifier associated with the first number is stored in a memory. At step 110, a first call for the user is received at the first number. The caller may be an individual to whom the user gave the first number. At step 112, the first identifier associated with the first number is retrieved from the memory upon receipt of the first call at the first number. At step 114, the first call and the first identifier are communicated to the user. The first call and first identifier may be communicated to a primary and/or non-public or unlisted number of the user at which the user receives the first call and first identifier.

Some of the steps illustrated in FIG. 3 may be combined, modified or deleted where appropriate, and additional steps may also be added to the flowchart. Additionally, steps may be performed in any suitable order without departing from the scope of the invention.

Particular embodiments of the invention described herein provide caller association based on the caller instead of the phone or device from which the call is being made. Thus, callers may be identified regardless of the device used to make the call. Other advantages of utilizing caller association systems described herein include the ability of users to hand out numbers without fear of receiving unsolicited calls. Users can also deactivate a number of the number had fallen into the hands of an undesired caller. As discussed above, users may provision incoming calls by giving out one number to one group of individuals and another number to another group. The system will inform user from which group a particular call is originating without regard to the particular device used to make the call. Moreover, caller association systems described herein dynamically generate as many numbers as needed without requiring manual configuration and multiple line assignment. Accordingly, substantial costs and time are saved.

In particular embodiments, the teachings discussed herein may be utilized with cell phones, web chat, instant messaging, e-mail and mailing addresses. For example, and in accordance with a particular embodiment, a user may request to have ten email addresses assigned to him/herself. The user may distribute the email addresses, one each to ten different third parties. Each of the ten addresses will be configured to send email to a single email account of the user, but the user will know who sent the message, based upon the email address used (e.g., the system can be configured to automatically identify the sender). The user may then disable one or more of the addresses, temporarily or permanently, if the user does not want to receive emails from the third party that the address was given to. In another embodiment, the user may opt to distribute the ten email accounts to groups, rather than to individuals. For example, the user may opt to give one address to family members, one address to work supervisors, one address to clients, one address to friends, etc. This allows the user to temporarily or permanently block emails or selectively allow emails from specific groups.

Although the present invention has been described in detail, various changes and modifications may be suggested to one skilled in the art. It is intended that the present invention encompass such changes and modifications as falling within the scope of the appended claims.

What is claimed is:

1. A method for caller association, comprising:
   receiving from a user a first request for a number that may be called to reach the user;
   generating a first number that may be called to reach the user;
   communicating the first number to the user;
   receiving from the user a first identifier associated with the first number, the first identifier comprising an identifier of a first party;
   receiving a first call for the user at the first number;
   generating a modified first identifier by augmenting or replacing caller identification information associated with the first call with the first identifier; and
   communicating the first call and the modified first identifier to a communication device associated with the user.

2. The method of claim 1, further comprising:
   storing the first identifier associated with the first number in a memory; and retrieving the first identifier associated with the first number from the memory upon receipt of the first call for the user at the first number.

3. The method of claim 1, further comprising charging a fee to the user for the first request for a number that may be called to reach the user.

4. The method of claim 1, further comprising deactivating the first number so that the first number may no longer be called to reach the user.

5. The method of claim 4, further comprising receiving a request from the user to deactivate the first number.

6. The method of claim 1, further comprising recycling the first number after a certain period of time so that the first number may be called to reach another user.

7. The method of claim 1, further comprising:
receiving from the user a second request for a number that may be called to reach the user;
generating a second number that may be called to reach the user;
communicating the second number to the user;
receiving from the user a second identifier associated with the second number, the second identifier comprising an identifier of a second party;
receiving a second call for the user at the second number; and
communicating the second call and the second identifier to the user.

8. The method of claim 1, wherein the first number is communicated to an operator, and the operator communicates the first number to the user.

9. The method of claim 7, further comprising:
receiving from the user one or more additional requests for a number that may be called to reach the user;
generating in response to the one or more additional requests one or more additional numbers that each may be called to reach the user;
communicating the one or more additional numbers to the user;
receiving from the user one or more additional identifiers each associated with a respective number of the one or more additional numbers, wherein each one or more additional identifier comprises an identifier of a respective party;
receiving an additional call for the user at one of the one or more additional numbers; and
communicating to the user the additional call and the identifier of the one or more additional identifiers associated with the one of the one or more additional numbers at which the additional call is received.

10. The method of claim 1, wherein the first number comprises a ten digit phone number.

11. The method of claim 9, further comprising temporarily deactivating the first, second or one or more additional numbers for a specific period of time, in response to a request of the user.

12. A system for caller association, comprising:
a number renderer operable to receive from a user at an interface a first request for a number that may be called to reach the user;
a number generator coupled to the number renderer, the number generator operable to generate a first number that may be called to reach the user;
the number renderer further operable to communicate the first number to the user;
a number associator coupled to the number renderer, the number associator operable to:
receive from the user a first identifier associated with the first number, the first identifier comprising an identifier of a first party; and
store the first identifier associated with the first number in a memory coupled to the number associator;
a number mapper coupled to the memory, the number mapper operable to retrieve the first identifier associated with the first number from the memory upon receipt of a first call for the user at the first number, the number mapper further operable to generate a modified first identifier by augmenting or replacing caller identification information associated with the first call with the first identifier; and
the interface operable to communicate to a communication device associated with the user the first call and the modified first identifier.

13. The system of claim 12, wherein the number renderer is operable to deactivate the first number so that the first number may no longer be called to reach the user.

14. The system of claim 13, wherein the number renderer is operable to receive a request from the user to deactivate the first number.

15. The system of claim 12, further comprising a number recycler coupled to the number renderer, the number recycler operable to recycle the first number after a certain period of time so that the first number may be called to reach another user.

16. The system of claim 12, wherein:
the number renderer is further operable to receive from a user at an interface one or more additional requests for one or more additional numbers that may be called to reach the user;
the number generator is further operable to generate in response to the one or more additional requests one or more additional numbers that each may be called to reach the user;
the number renderer is further operable to communicate the one or more additional numbers to the user;
the number associator is further operable to:
receive from the user one or more additional identifiers each associated with a respective number of the one or more additional numbers, each one or more additional identifier comprising an identifier of a respective party; and
store the one or more additional identifiers in the memory;
the number mapper is further operable to, upon receipt of an additional call at one of the one or more additional numbers, retrieve the identifier of the one or more additional identifiers associated with the one of the one or more additional numbers at which the additional call is received; and
the interface further operable to communicate to the user the additional call and the retrieved identifier of the one or more additional identifiers.

17. The system of claim 12, wherein the first number comprises a ten digit phone number.

18. The system of claim 12, wherein the number renderer is operable to communicate the first number to the user using the world wide web, and the user receives the first number at a telephony user interface.

19. The system of claim 12, further comprising an authentication module operable to verify a user name and password of the user.

20. The system of claim 12, wherein the first number is an internal extension assigned to the user.

21. A system for caller association, comprising:
means for receiving from a user a first request for a number that may be called to reach the user;
means for generating a first number that may be called to reach the user;
means for communicating the first number to the user;
means for receiving from the user a first identifier associated with the first number, the first identifier comprising an identifier of a first party;
means for receiving a first call for the user at the first number;
means for generating a modified first identifier by augmenting or replacing caller identification information associated with the first call with the first identifier; and
means for communicating the first call and the modified first identifier to a communication device associated with the user.

22. The system of claim 21, further comprising:
means for storing the first identifier associated with the first number in a memory; and
means for retrieving the first identifier associated with the first number from the memory upon receipt of the first call for the user at the first number.

23. The system of claim 21, further comprising means for charging a fee to the user for the first request for a number that may be called to reach the user.

24. The system of claim 21, further comprising means for deactivating the first number so that the first number may no longer be called to reach the user.

25. The system of claim 21, further comprising means for recycling the first number after a certain period of time so that the first number may be called to reach another user.

26. The system of claim 21, further comprising:
means for receiving from the user one or more additional requests for a number that may be called to reach the user;
means for generating in response to the one or more additional requests one or more additional numbers that each may be called to reach the user;
means for communicating the one or more additional numbers to the user;
means for receiving from the user one or more additional identifiers each associated with a respective number of the one or more additional numbers, wherein each one or more additional identifier comprises an identifier of a respective party;
means for receiving an additional call for the user at one of the one or more additional numbers; and
means for communicating to the user the additional call and the identifier of the one or more additional identifiers associated with the one of the one or more additional numbers at which the additional call is received.

27. Software embodied in a computer readable medium, the computer readable medium comprising code operable to:
receive from a user a first request for a number that may be called to reach the user;
generate a first number that may be called to reach the user;
communicate the first number to the user;
receive from the user a first identifier associated with the first number, the first identifier comprising an identifier of a first party;
receive a first call for the user at the first number;
generate a modified first identifier by augmenting or replacing caller identification information associated with the first call with the first identifier; and
communicate the first call and the modified first identifier to a communication device associated with the user.

28. The medium of claim 27, wherein the code is further operable to:
store the first identifier associated with the first number in a memory; and
retrieve the first identifier associated with the first number from the memory upon receipt of the first call for the user at the first number.

29. The medium of claim 27, wherein the code is further operable to charge a fee to the user for the first request for a number that may be called to reach the user.

30. The medium of claim 27, wherein the code is further operable to deactivate the first number so that the first number may no longer be called to reach the user.

31. The medium of claim 30, wherein the code is further operable to receive a request from the user to deactivate the first number.

32. The medium of claim 27, wherein the code is further operable to recycle the first number after a certain period of time so that the first number may be called to reach another user.

33. The medium of claim 27, wherein the code is further operable to:
receive from the user one or more additional requests for a number that may be called to reach the user;
generate in response to the one or more additional requests one or more additional numbers that each may be called to reach the user;
communicate the one or more additional numbers to the user;
receive from the user one or more additional identifiers each associated with a respective number of the one or more additional numbers, wherein each one or more additional identifier comprises an identifier of a respective party;
receive an additional call for the user at one of the one or more additional numbers; and
communicate to the user the additional call and the identifier of the one or more additional identifiers associated with the one of the one or more additional numbers at which the additional call is received.

34. The medium of claim 27, wherein the first number comprises a ten digit phone number.

* * * * *

UNITED STATES PATENT AND TRADEMARK OFFICE
CERTIFICATE OF CORRECTION

PATENT NO. : 7,602,894 B1  Page 1 of 1
APPLICATION NO. : 10/443630
DATED : October 13, 2009
INVENTOR(S) : Shaffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Fifth Day of October, 2010

David J. Kappos
*Director of the United States Patent and Trademark Office*